United States Patent
Gretz

(10) Patent No.: US 9,735,557 B1
(45) Date of Patent: Aug. 15, 2017

(54) ELECTRICAL BOX HANGER ASSEMBLY

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 1 day.

(21) Appl. No.: 15/059,819

(22) Filed: Mar. 3, 2016

Related U.S. Application Data

(60) Provisional application No. 62/129,875, filed on Mar. 8, 2015.

(51) Int. Cl.
*H02G 3/10* (2006.01)
*H02G 3/08* (2006.01)

(52) U.S. Cl.
CPC ............. *H02G 3/10* (2013.01); *H02G 3/081* (2013.01)

(58) Field of Classification Search
USPC .......................................................... 174/50
See application file for complete search history.

(56) References Cited

U.S. PATENT DOCUMENTS

| | | | |
|---|---|---|---|
| 3,214,126 A | * | 10/1965 | Roos ................. H02G 3/125 220/3.4 |
| 5,934,631 A | | 8/1999 | Becker et al. |
| 5,938,157 A | | 8/1999 | Reiker |
| 5,954,304 A | | 9/1999 | Jorgensen |
| 6,098,945 A | | 8/2000 | Korcz |
| 6,768,071 B1 | | 7/2004 | Gretz |
| 6,967,284 B1 | | 11/2005 | Gretz |
| 7,355,118 B1 | | 4/2008 | Gretz |

* cited by examiner

*Primary Examiner* — Dhirubhai R Patel

(57) ABSTRACT

An electrical box hanger assembly for hanging an electrical fixture from a ceiling. All hardware required for mounting the electrical device is included with the assembly. An adjustable mounting bar includes sliding tubular members with end flanges for spanning between adjacent overhead joists. An electrical box is connected to the adjustable mounting bar by a one-piece mounting bracket and a single box mounting fastener. The mounting bracket includes integral tensioner tangs on the mounting bracket prevent backing out of the box mounting fastener after it is secured in place. Bar fasteners are used to securely fasten the mounting bar to the joists. Load bearing device fasteners used to secure the mounting ring of an electrical fixture to the electrical box. Oversize openings are provided in the top wall of the electrical box to ensure that the suspended load is borne by the clamp and mounting bar and not the electrical box.

7 Claims, 11 Drawing Sheets

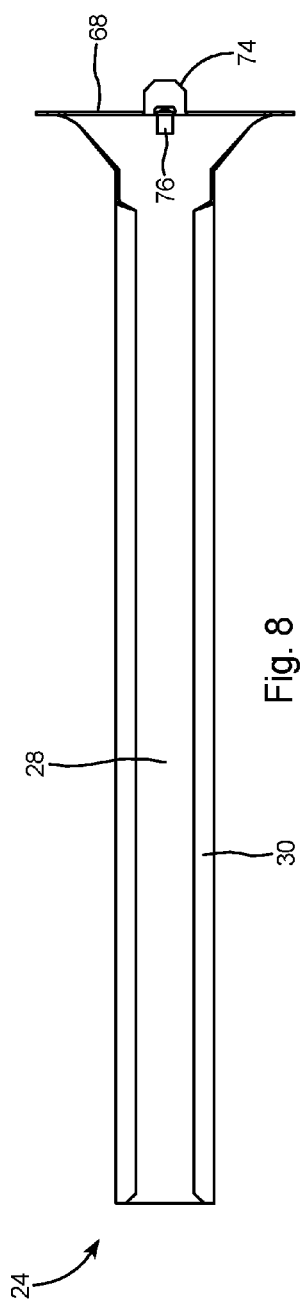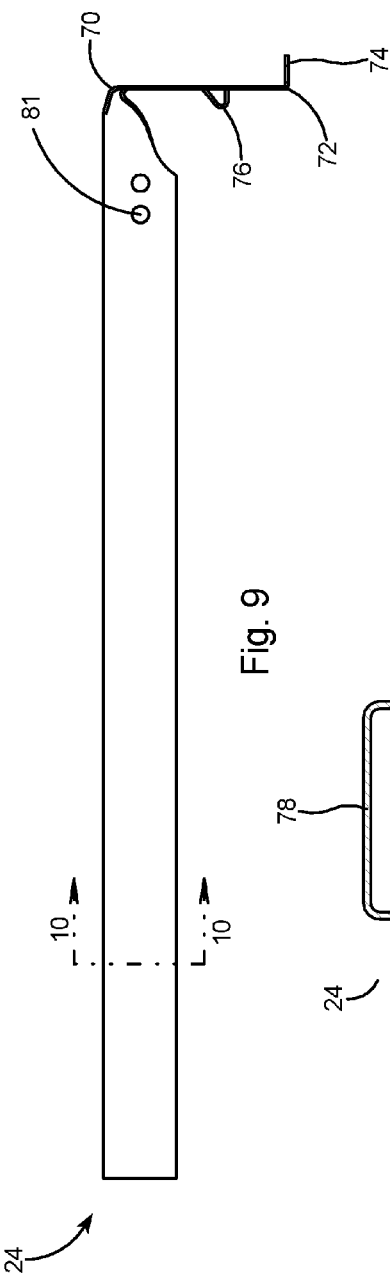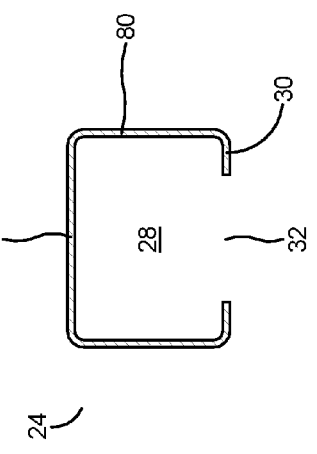

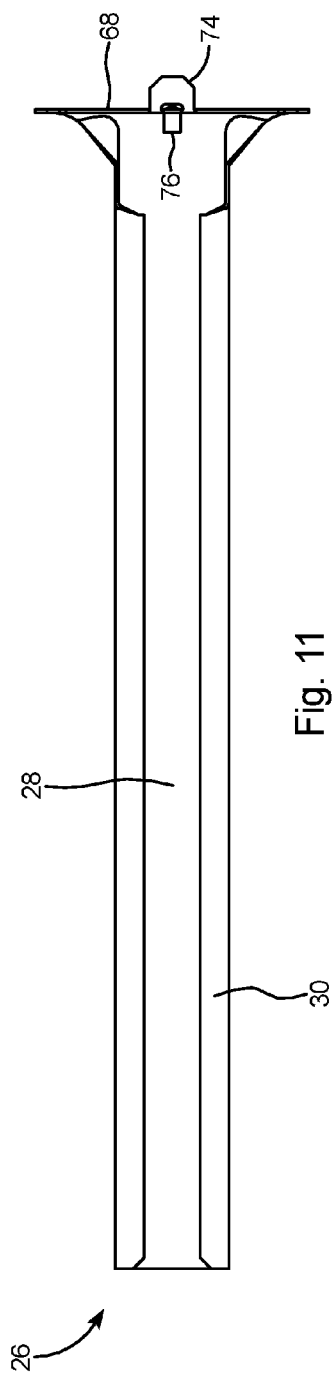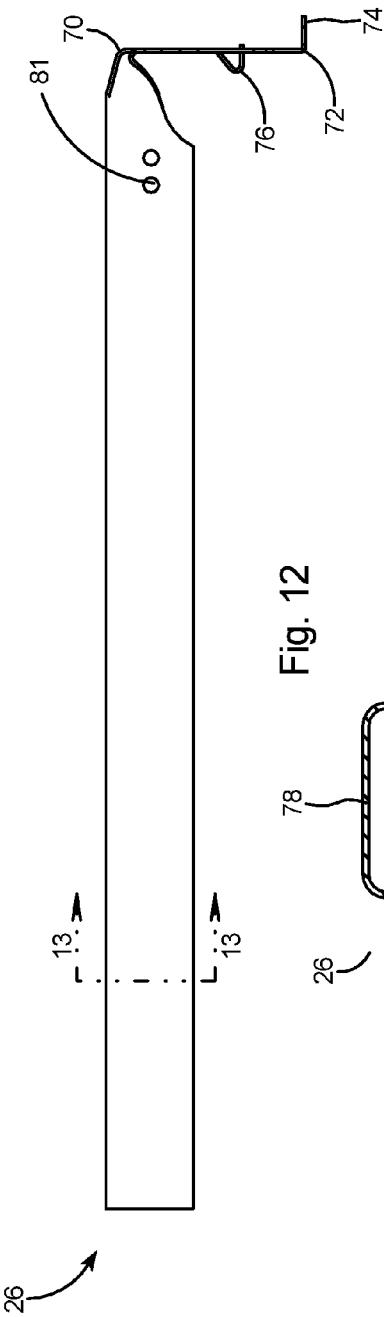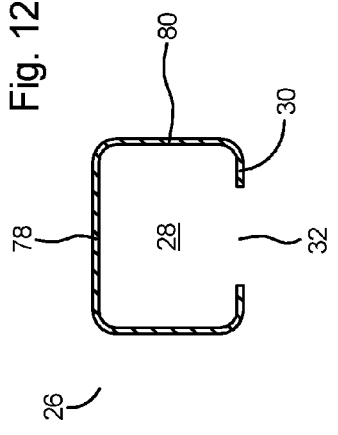

ELECTRICAL BOX HANGER ASSEMBLY

CROSS-REFERENCE TO RELATED APPLICATIONS

This application claims priority to provisional U.S. Application No. 62/129,875, filed Mar. 8, 2015, the contents of which is incorporated herein by reference in its entirety.

FIELD OF THE INVENTION

This invention relates to electrical junction boxes and more particularly to an adjustable hanger bar and electrical box combination for hanging an electrical fixture or component from an overhead support.

BACKGROUND

Electrical boxes are commonly mounted on ceilings for the purpose of supporting ceiling fans, light fixtures, or other electrical devices. The electrical box provides a safe enclosure to house all wiring connections. Typically, these electrical boxes are secured to the ceiling by a supporting device that spans between two adjacent ceiling joists.

Various considerations are necessary in providing supporting devices for ceiling-mounted electrical boxes. The National Electrical Code specifies a minimum weight of 50 pounds for ceiling light fixtures and a maximum weight of 70 pounds for ceiling fans. It is therefore very important that an installer use adequate load-bearing fasteners for securing the supporting device to the overhead joists. It is also important that the load be carried by the supporting device, and not by the electrical box.

A second consideration arises from the awkwardness of working overhead. Typically, when securing a supporting device and an electrical box to the overhead structure of the ceiling, the installer must assemble several items together while reaching overhead. These include the mounting bar, the electrical box, the fasteners for securing the mounting bar to the ceiling structure, and the fasteners for mounting the electrical box to the mounting bar. Considering that the installer is typically on a ladder and reaching upwards, this creates a challenging task for any installer. It is therefore imperative that all parts necessary for a successful installation are on hand for the installer.

For installation of fan fixtures, a further consideration is that the electrical box must be connected support device must be as simple as possible. Many prior art supporting devices require the use of two-piece mounting brackets and multiple fasteners for attaching the electrical box to the support device, which creates a difficult assembly task for the installer as several components must be handled while at the same time supporting the overhead support device.

Accordingly, it would be advantageous to supply a support device that simplifies the procedure for hanging an electrical box or fixture from overhead joists while freeing up the installer's hands.

BRIEF SUMMARY OF THE INVENTION

The invention is an adjustable mounting bar and electrical box assembly for hanging a light fixture, fan, or other electrical device from a ceiling. All hardware required for mounting the electrical device is included as part of the assembly thereby eliminating the need for separate bagged parts or pieces to lose. The adjustable mounting bar includes sliding tubular members with end flanges for spanning between adjacent overhead joists. An electrical box is connected to the tubular members by a clamp and a single clamping fastener, which can be loosened to adjust the location of the electrical box with respect to the adjustable mounting bar. The end flanges include a nailing tooth that can be driven into the overhead joists to temporarily secure the adjustable mounting bar to the joists and thereby free the installer's hands for subsequent installation tasks. Bar mounting fasteners are threadably engaged in first storage receptacles in the sliding tubular members of the assembly and upon temporary securement to the joists, can be removed from the first storage receptacles and fastened through the end flanges to securely fasten the mounting bar to the joists. The assembly includes fixture mounting fasteners that are threadably engaged in second storage receptacles in the electrical box. After the mounting bar is secured to the joists and the electrical box is secured to the mounting bar, the device fasteners can be removed from the second storage receptacles and the mounting ring of an electrical device or fixture brought into engagement with the lower edge of the electrical box. The box mounting screw is then driven through the electrical box, through the elongated slot in the adjustable bars, and into a threaded box attachment bore in the clamp. Oversize openings are provided in the top wall of the electrical box to ensure that the entire suspended load is borne by the clamp and the mounting bars and not the electrical box.

OBJECTS AND ADVANTAGES

A first object is to supply a complete mounting assembly for mounting an electrical device to a ceiling, including all of the required fastening hardware. All of the installation hardware that is required to complete the task is provided as a part of the mounting assembly, including all required fasteners.

A further object is to provide a box mounting bracket with integral tension tangs that prevent backing out of box mounting fasteners while withstanding vibration of a fan or similar device.

A further object of the invention is the provision of an alignment tab on the electrical box for rapidly aligning the electrical box with respect to the adjustable bars and to the box mounting bracket.

Another object of the invention is to enable a secure mounting of an electrical box to an adjustable hanger bar by use of a single fastener.

An additional advantage is that the required fasteners are held securely in the electrical box mounting assembly in temporary storage receptacles. The temporary storage receptacles provide an advantage in that the fasteners are held securely in the assembly until they are ready to be used. The required fastening hardware is therefore on hand for installation at the time it is required. By freeing up an installer's hands, the task of mounting an electrical device to a ceiling is therefore greatly simplified and the installation time greatly reduced. Additionally, by having all of the required fastening hardware on hand, the installer is not burdened by the task of locating appropriate fasteners at the appropriate time.

The electrical box mounting assembly also provides the advantage that all of the load is supported by the supporting bars and the clamp, and not by the electrical box itself.

A further advantage is that the fastening hardware, while in storage in the temporary storage receptacles, does not extend beyond the outer periphery of the bars and end flanges.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein:

FIG. 8 is a plan view of a male hanger bar according to the present invention.

FIG. 9 is a side view of the male hanger bar of FIG. 8.

FIG. 10 is a sectional view of the male hanger bar taken along line 10-10 of FIG. 9.

FIG. 11 is a plan view of a female hanger bar according to the present invention.

FIG. 12 is a side view of the female hanger bar of FIG. 8.

FIG. 13 is a sectional view of the female hanger bar taken along line 13-13 of FIG. 12.

DETAILED DESCRIPTION

Figure 1:
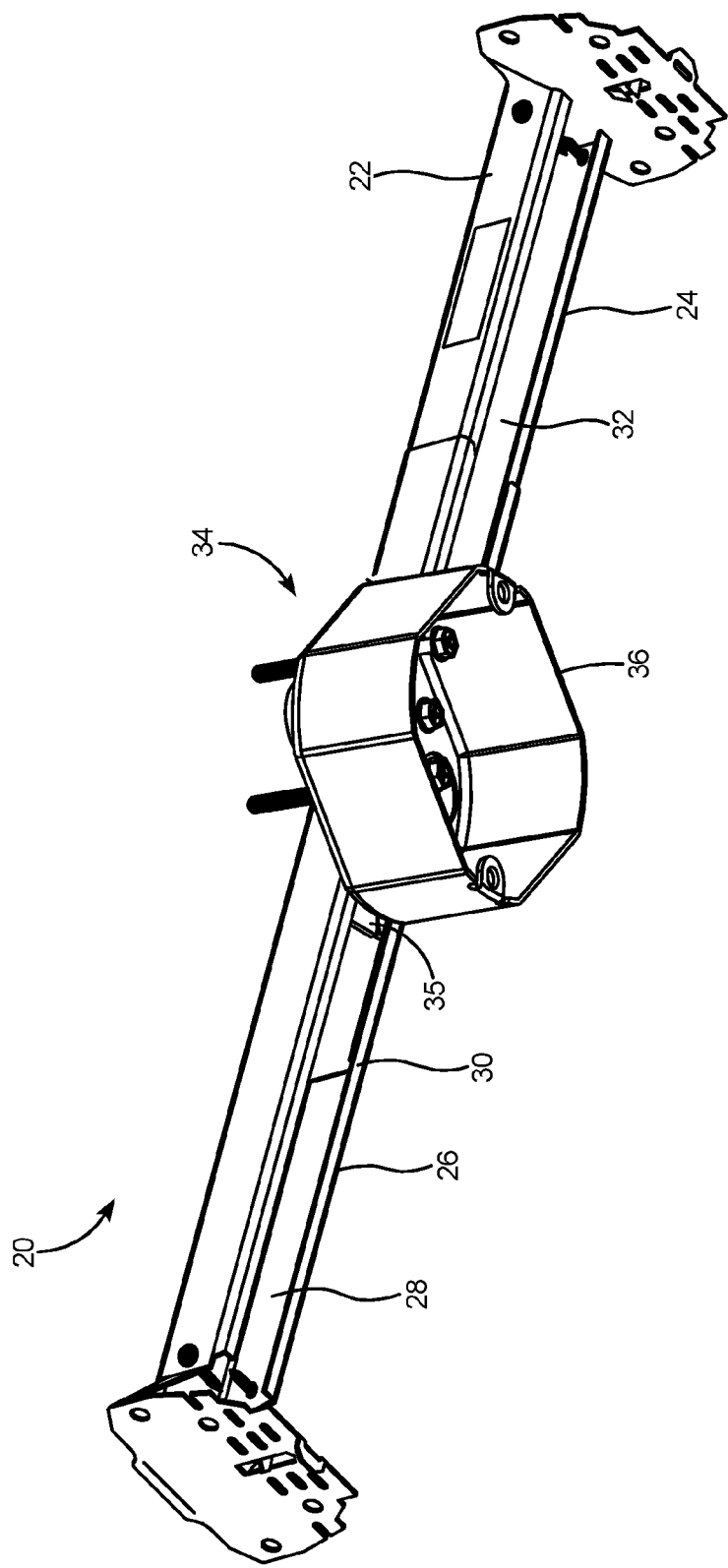
FIG. 1 is an isometric view of an electrical box hanger assembly, in accordance with embodiments of the invention.

With reference to FIG. 1, there is shown a preferred embodiment of an electrical box hanger assembly 20 according to the present invention. The adjustable hanger bar assembly 20 includes an adjustable hanger assembly 22 that includes an inner bar member 24 and an outer bar member 26. The inner bar member 24 is slideable within the outer bar member 26 of the adjustable hanger assembly 22, thereby creating an interior channel 28 and parallel bottom lips 30 that define an elongated longitudinal slot 32 running lengthwise along the adjustable hanger assembly 22. The electrical box hanger assembly 20 includes a fan box assembly 34 (see FIG. 1) that is secured to the adjustable bar hanger 22 with a flat mounting bracket 35 that is positioned inside the interior channel 28 of the adjustable hanger assembly 22.

Referring to FIGS. 2-5, the fan box assembly 34 includes an electrical box or fan box 36 with four flat walls 38, four arcuate walls 40, a rim 41, and a top wall 42 defining an electrical enclosure 44 therein. Lugs 46 extend from the rim 41 of two opposing arcuate walls 40. The lugs 46 are located substantially 180 degrees apart on opposing sides of the electrical box. Apertures 48 in lugs 46 are in coaxial with slots 50 in top wall 42 of electrical box 36. One or more knockout openings 52 are provided in the top wall 42 and the knockout openings may include a nonmetallic electrical cable fitting 54 as shown in the top right corner of FIG. 2, such as the Black Button™ push-in fitting or connector for connecting non-metallic cable to electrical boxes. The Black Button™ push-in fitting is available from Arlington Industries of Scranton, Pa. Use of the push-in fitting 54 will enable push-in connection of a non-metallic cable (not shown) to the fan box 36.

Figure 2:
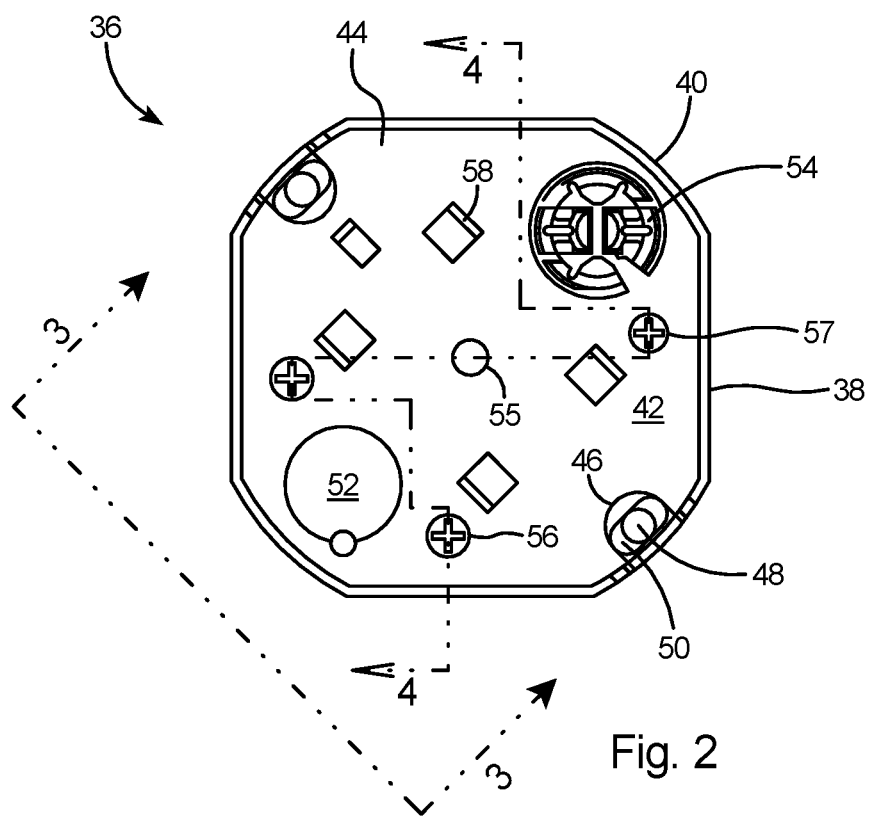
FIG. 2 is a bottom view of an electrical box that forms a portion of the electrical box assembly of FIG. 1.
Figure 3:
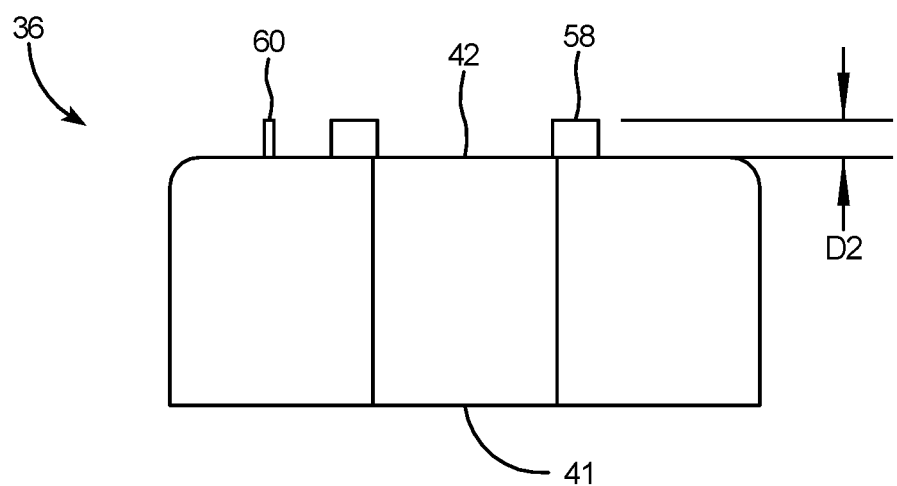
FIG. 3 is a side view of the electrical box as viewed along line 3-3 of FIG. 2.
Figure 4:
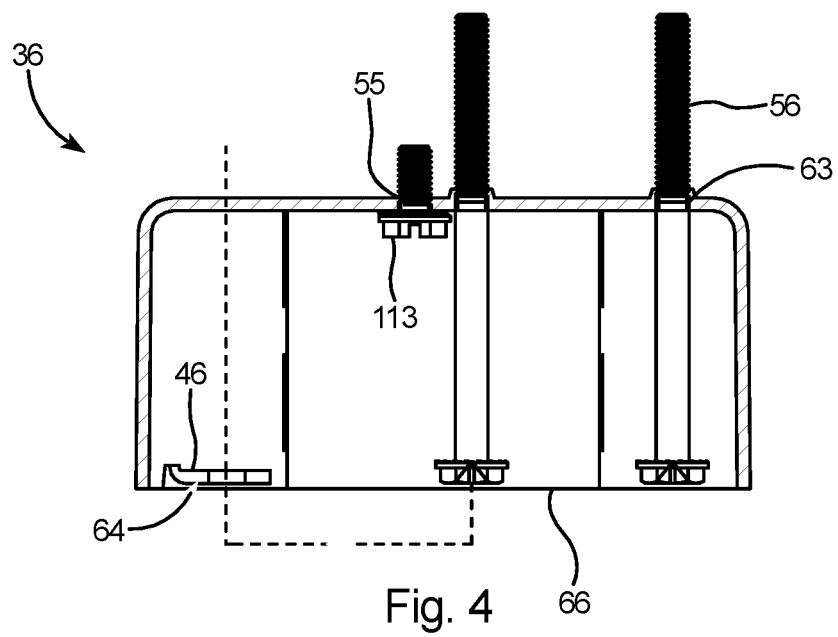
FIG. 4 is a sectional view of the electrical box taken along line 4-4 of FIG. 2.
Figure 5:
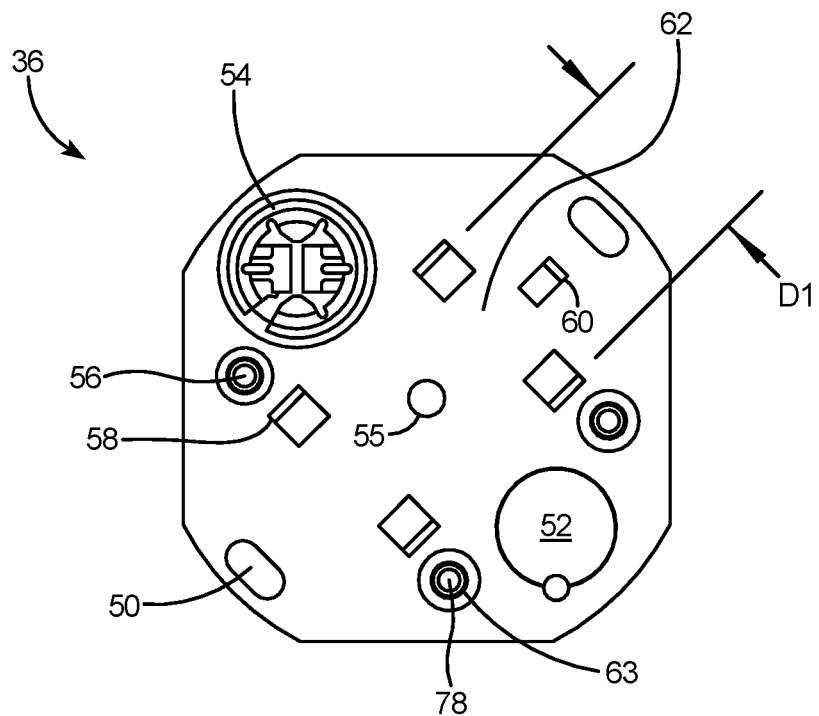
FIG. 5 is a top view of an electrical box that forms a portion of the electrical box assembly of FIG. 1.
Figure 6:
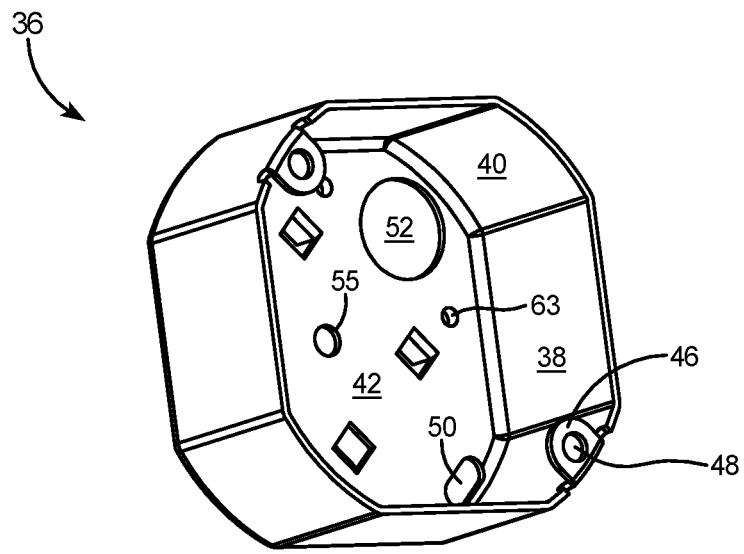
FIG. 6 is an isometric view of the electrical box as viewed from the bottom or open end.
Figure 7:
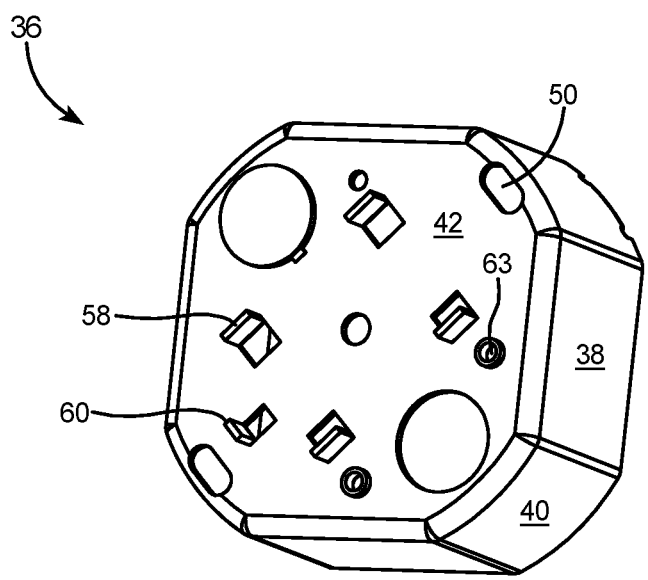
FIG. 7 is an isometric view of the electrical box as viewed from the top or closed end.

Top wall 42 of electrical box 36 further includes a box assembly aperture 55 two fixture mounting screws 56 and a grounding screw 57 as shown in FIG. 2. Top wall 42 of electrical box 36 further includes a plurality of bar engagement tabs 58 bent outward of the top wall and an alignment tab 60 bent outward of the top wall. Bar engagement tabs 58 define a bar engagement channel 62 as shown by distance D1 in FIG. 5. Bar engagement tabs 58 preferably extend by at least distance D2 from top wall 42 as shown in FIG. 3. As shown in FIG. 5, top wall 42 includes two threaded storage bores 63, for captivity holding fixture mounting screws 56 (see FIG. 4) with the electrical box 36 until they are required for installation of the electrical box hanger assembly 20 to a rafter or similar overhead support. As the fixture mounting screws 56 are of substantial length (see FIG. 1), it is critical that the threaded storage bores 63 and the fixture mounting screws 56 are located outside of the bar engagement channel 62 of the electrical box 36. Thus the fixture mounting screws 56 will be positioned to the side of the adjustable hanger assembly 22 and will not interfere with connection of electrical box 36 to adjustable hanger assembly 22 prior to the fixture mounting screws being used to secure a light or fan fixture to the electrical box hanger assembly 20.

The electrical box 36 of the present invention may be constructed of metal or plastic. If constructed of metal, it is preferably constructed of steel, and most preferably of 0.062-inch AISI 1010 steel that is galvanized with a minimum zinc plating thickness of 0.0005-inch. As shown in FIG. 4, the lugs 46 include a bottom face 64 that is substantially planar with the lower edge 66 of the electrical box 36.

With reference to FIGS. 8-13, the inner bar member 24 and outer bar member 26 each include an end plate 68 with a top end 70 and a bottom end 72. An alignment tab 74 extends from the bottom end 72 of the end plate and a nailing tooth 76 is lanced from and bent inward of the end plate. As shown particularly in FIGS. 10 and 13, the bar members 24 and 26 are substantially U-shaped and include a top wall 78 and two side walls 80. Paired threaded bores 81 (see FIGS. 10 and 13) are provided in the side walls 80 of the bar members 24 and 26 substantially near the end plates 68. The bar members 24 and 26 are preferably formed from 1010 sheet steel with a minimum thickness of 0.046 inch and are zinc-plated.

Figures 14, 15:
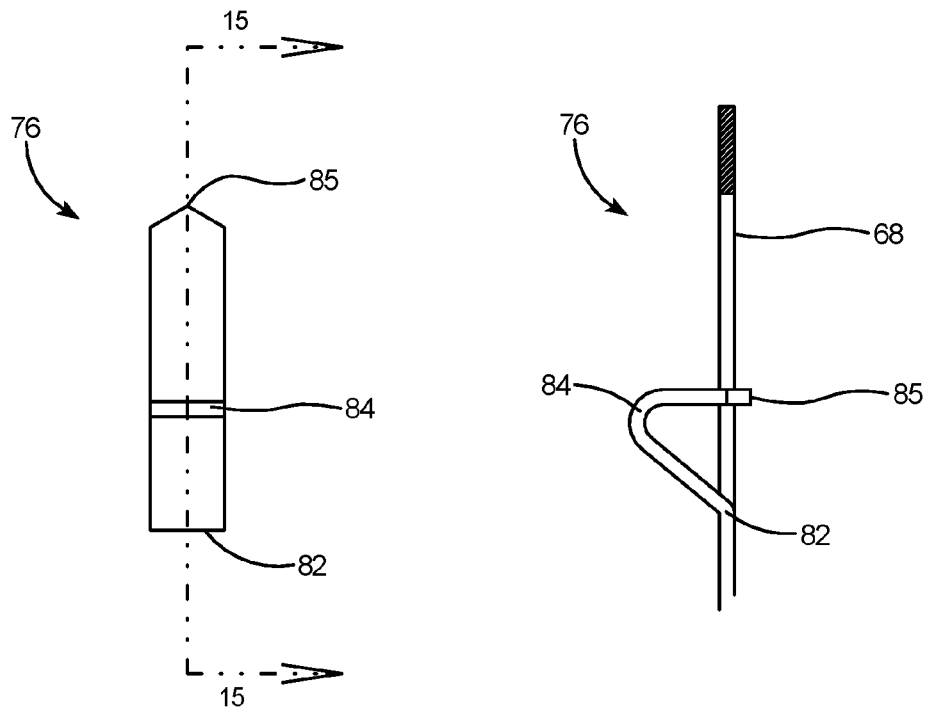
FIG. 14 is a plan view of an anchor tab that forms a portion of the end plate of each hanger bar according to the present invention.
FIG. 15 is a sectional view of the anchor tab taken along line 15-15 of FIG. 14.
Figure 16:
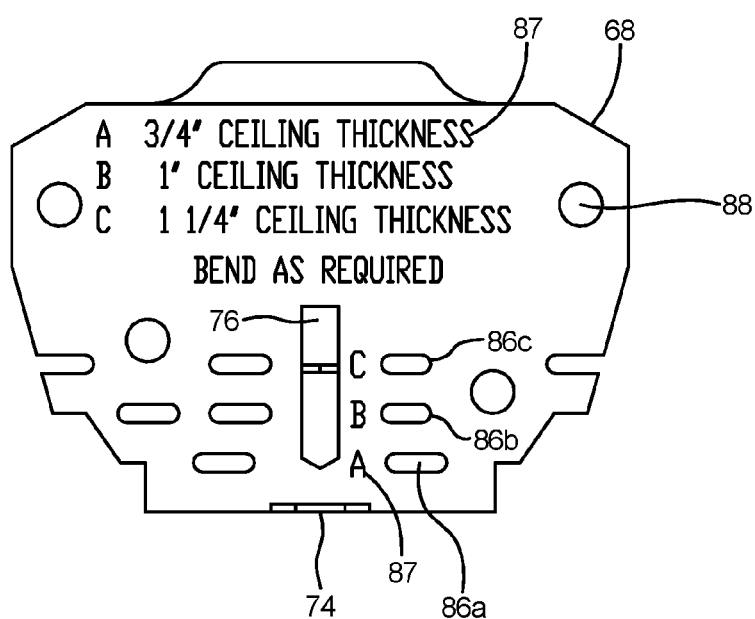
FIG. 16 is an end view of the electrical box hanger assembly of FIG. 1.
Figure 17:
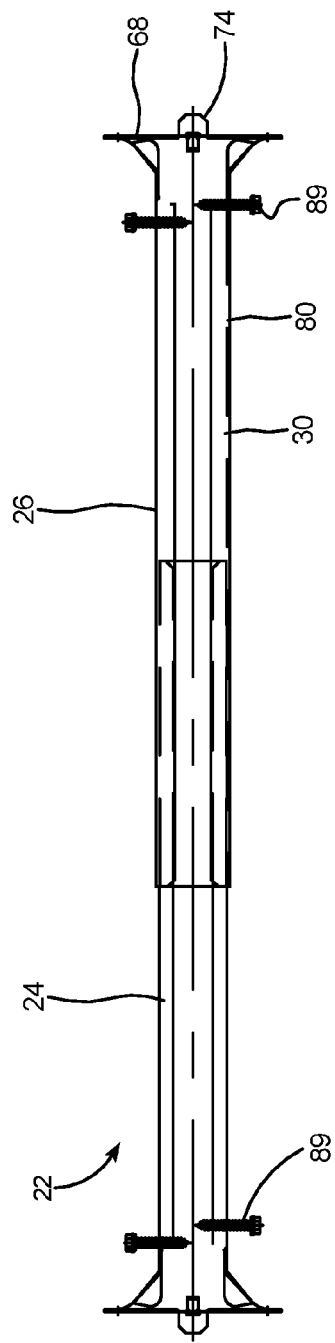
FIG. 17 is a plan view of an adjustable hanger bar according to the present invention.
Figure 18:
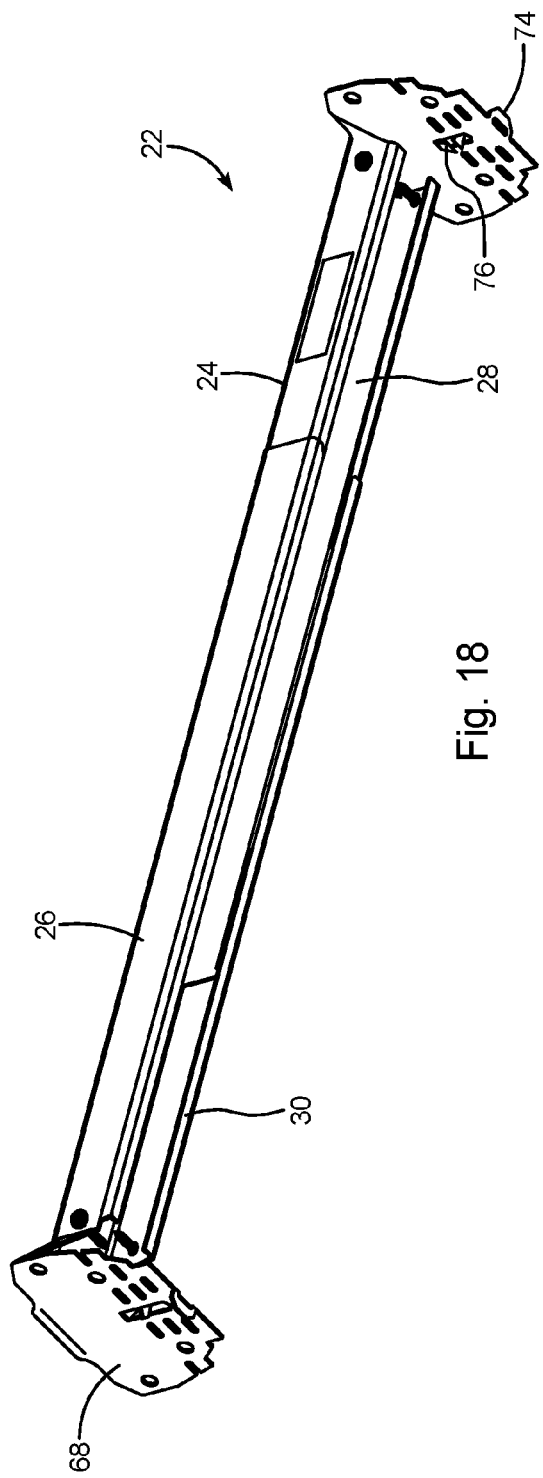
FIG. 18 is a sectional view of the adjustable hanger bar of FIG. 17.

As shown in FIGS. 14 and 15, the nailing tooth 76 includes a base end 82 where it is integral with the end plate 68, a sharp bend 84, and a pointed tip 85. As shown in FIG. 16, each end plate 68 includes a plurality of rows of slots 86a, 86b, and 86c and indicia 87 thereon to indicate where the end plates should be aligned with respect to an overhead rafter or similar support in order to accommodate the desired thickness of ceiling wallboard. One or more nailing apertures 88 are provided in the end plate 68. Referring to FIGS. 17-18, the adjustable hanger assembly 22 includes the inner bar 24 and outer bar 26 assembled together, with the inner bar slideable within the outer bar 26 and two bar fasteners 89 held captive within the side walls 80 of the bar members 24 and 26.

Figure 19:
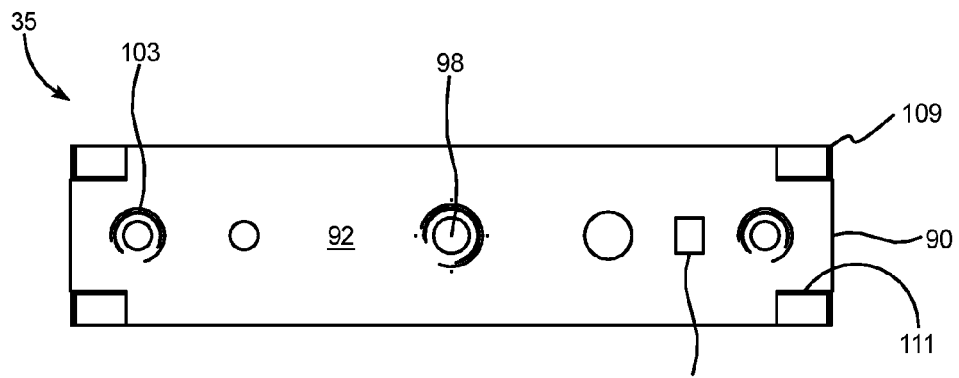
FIG. 19 is a top view of an electrical box mounting bracket that forms a portion of the electrical box hanger assembly of FIG. 1.
Figure 20:
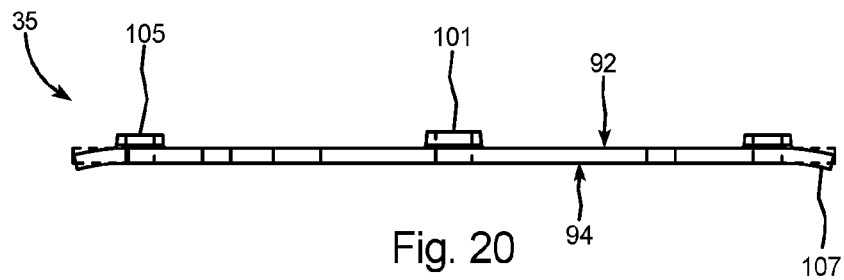
FIG. 20 is a side view of the electrical box mounting bracket.
Figure 20A:
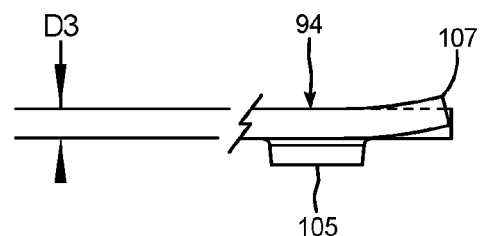
FIG. 20A is a detail view of the end portion of the electrical box mounting bracket.
Figure 21:
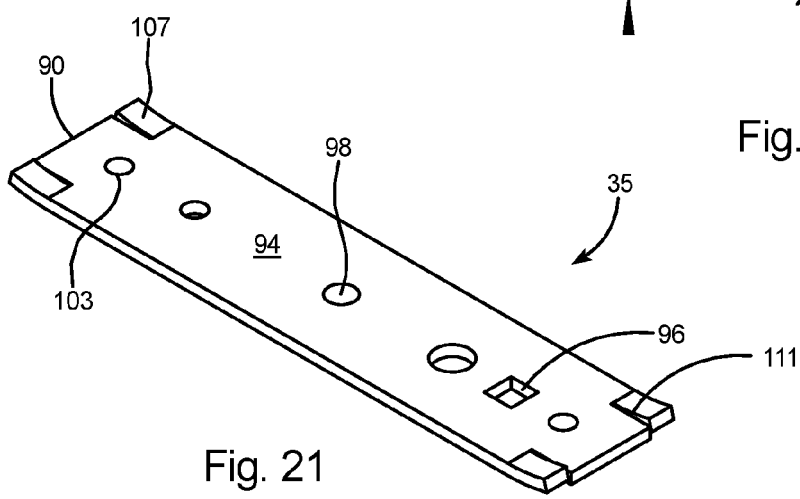
FIG. 21 is an isometric view of the electrical box mounting bracket.

Referring to FIGS. 19-20, the mounting bracket 35 is a substantially flat elongated metal bar having two ends 90, and an upper surface 92 and a lower surface 94. The mounting bracket 35 further includes an alignment slot 96; a threaded box attachment bore 98 and an associated box attachment boss 101 in axial alignment therewith. The mounting bracket 35 also includes threaded fixture attachment bores 103 and an associated fixture attachment boss 105 in axial alignment therewith. A tensioner tang 107 is provided on at least one corner 109 of the mounting bracket 35. The tensioner tangs 107 are each defined by a longitudinal slit 111 in the mounting bracket and each tensioner tang is bent toward the lower surface 94 and out of the plane of the mounting bracket as shown in FIG. 20A. Preferably, the mounting bracket 35 is constructed of steel and is at least 0.083 inch thick, as denoted by thickness D3 in FIG. 20A. Threaded box attachment bore 98 is preferably centered on said mounting bracket 35.

Figure 22:
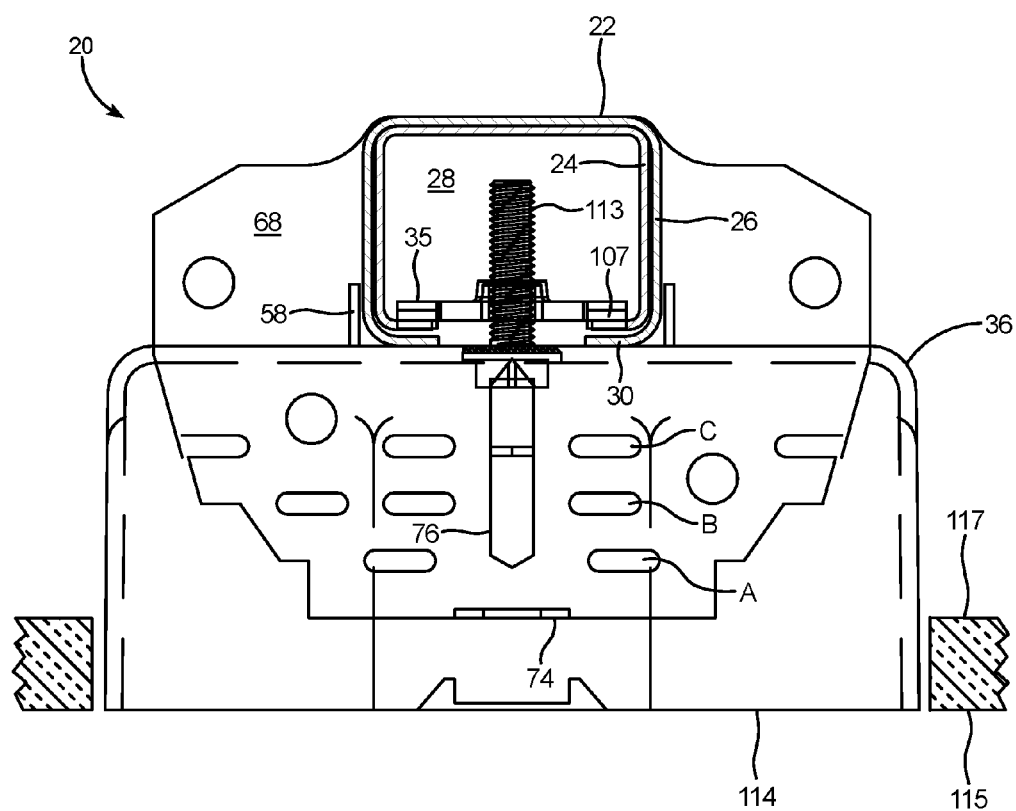
FIG. 22 is an end view of the electrical box hanger assembly of the present invention, depicting the electrical box in relation to the hanger bars, box mounting bracket, and end plates of the assembly.

Referring to FIG. 22, when preparing to install the electrical box hanger assembly 20, such as between two rafters (not shown), the inner bar member 24 resides within the outer bar member 26 and the two members are slideable with respect to one another. Bar engagement tabs 58 contact the side walls of the outer bar member 26 and quickly align the electrical box 36 with the adjustable hanger assembly 22. A single box mounting screw 113 passes from the interior of electrical box 36 and through center hole in electrical box 36 and thence through center hole in mounting bracket 35. For accommodating one-half inch thick wallboard, end plates 68 are aligned with the rafters with bottom tab 74 of the end plate 68 flush against the bottom edges of the rafters. To accommodate ¾-inch, 1-inch, or 1.25-inch thick wallboard, the end plates 68 of adjustable hanger assembly 22 is aligned respectively with row A of slots, row B of slots, or row C of slots. After the adjustable hanger assembly 22 is adjusted for wallboard thickness and is adjusted to fit between two parallel rafters, nailing tooth 76 is hammered into the rafter for each of the end plates 68 to temporarily secure the electrical box hanger assembly 20 to the rafters. Fasteners such as nails or screws (not shown) are then driven through nailing apertures into the rafters to permanently secure the adjustable hanger bar assembly to the rafters. For the assembly shown in FIG. 22, the resultant installation will then have bottom edge 114 of electrical box 36 aligned with the bottom surface 115 of the surrounding wallboard 117.

Figure 23:
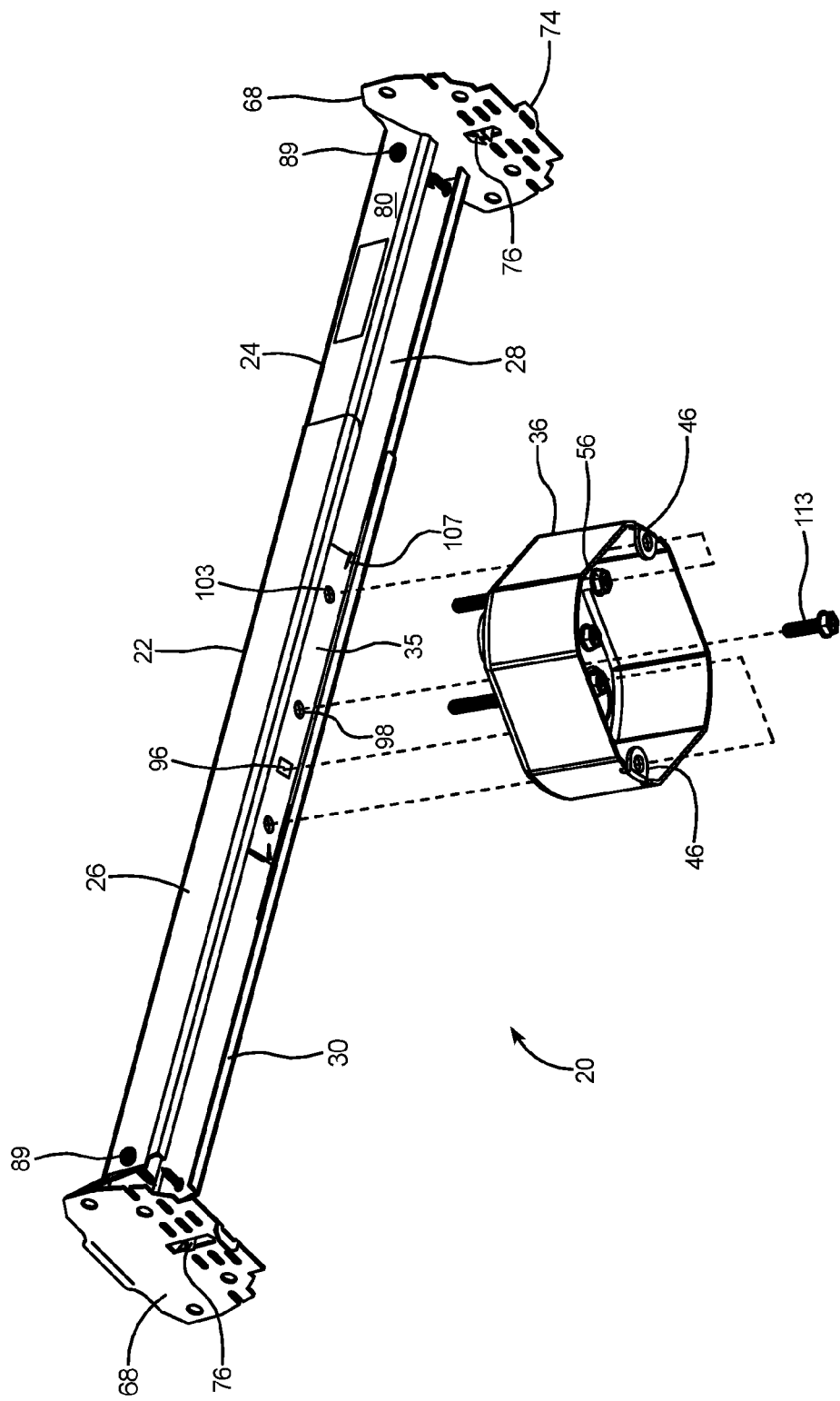
FIG. 23 is an exploded isometric view of an electrical box hanger assembly, in accordance with embodiments of the invention.

With reference to FIG. 23, electrical box hanger assembly 20 includes adjustable hanger assembly 22 assembled with inner bar 24 nested within outer bar 26. Mounting bracket 35 nests within channel 28 of adjustable bar assembly with tensioner tangs 107 of mounting bracket 35 sliding along lips 30 of adjustable hanger assembly 22. End plates 68 are aligned for the correct wall board thickness and secured to the rafters (not shown). Mounting screw 113 is then driven through box assembly aperture 55 (see FIG. 2) of electrical box 36 and threaded loosely into threaded box attachment bore 98 of mounting bracket 35, after which electrical box 36 is assembled to mounting bracket and mounting bracket 35 and electrical box 36 assembly are then slideable with respect to adjustable hanger assembly 22. After the nailing tooth 76 of each end plate 68 is nailed into the respective rafter (not shown), the electrical box 36 may be secured at the desired position along the adjustable hanger assembly 22 by tightening mounting screw 113 into mounting bracket 35. Fixture mounting screws 56 may then be removed from their captive position in paired threaded bores 78 (see FIG. 5) and passed through holes in fixture mount (not shown) and passed through lugs 46 of electrical box 36 and tightened into threaded fixture attachment bores 103 of mounting bracket 35 to secure the mounting bracket (not shown) of an electrical fixture, such as a ceiling fan or light fixture, to the electrical box hanger assembly 20 and thus securely to the overhead rafters.

Having thus described the invention with reference to a preferred embodiment, it is to be understood that the invention is not so limited by the description herein but is defined as follows by the appended claims. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention.

What is claimed is:

1. An electrical box hanger assembly, comprising:
   an adjustable hanger assembly including an inner bar member slideably engaged within an outer bar member and an inner channel;
   parallel bottom lips on said adjustable hanger assembly, said parallel bottom lips define an elongated slot running lengthwise along the adjustable hanger assembly;
   an electrical box including sidewalls and a top wall defining an electrical enclosure;
   a substantially planar one-piece mounting bracket slideably disposed within said inner channel;
   a tensioner tang on said mounting bracket, said tensioner tang bent out of the plane of the mounting bracket, said tensioner tang engaging said parallel bottom lips of said adjustable hanger assembly;
   a box mounting screw securing said electrical box to said adjustable hanger assembly; and
   said tensioner tang compressed between said parallel bottom lips of said adjustable hanger assembly and said electrical box preventing backing out of said box mounting screw while withstanding vibration of a fan or similar device.

2. The electrical box hanger assembly of claim 1, further comprising:
   said bar members including side walls;
   a threaded bore in each of said side walls of said bar members; and
   bar fasteners held captive within said threaded bore in said side walls of said bar members.

3. The electrical box hanger assembly of claim 2, further comprising:
  end plates on said bar members, said end plates having an aperture therein; and
  said bar fasteners removable from said side walls and insertable through said aperture in said end plate for securing said adjustable hanger assembly to a joist.

4. An electrical box hanger assembly, comprising:
  an adjustable hanger assembly including an inner bar member slideably engaged within an outer bar member and an inner channel;
  an electrical box including sidewalls and a top wall defining an electrical enclosure;
  a plurality of bar engagement tabs extending from said top wall of said electrical box, said bar engagement tabs defining a bar engagement channel on said top wall of said electrical box;
  a substantially planar one-piece mounting bracket slideably disposed within said inner channel of said adjustable hanger assembly, said one-piece mounting bracket having opposing ends and fixture attachment bores on said opposing ends;
  threaded storage bores in said top wall of said electrical box;
  two fixture mounting screws captivity held in said threaded storage bores;
  a tensioner tang on said mounting bracket, said tensioner tang bent out of the plane of the mounting bracket, said tensioner tang engaging said parallel bottom lips of said adjustable hanger assembly;
  a box mounting screw securing said electrical box to said adjustable hanger assembly; and
  said tensioner tang compressed between said parallel bottom lips of said adjustable hanger assembly and said electrical box preventing backing out of the box mounting screw while withstanding vibration of a fan or similar device.

5. The electrical box hanger assembly of claim 4, wherein said threaded storage bores and said fixture mounting screws are located outside of said bar engagement channel of said electrical box.

6. The electrical box hanger assembly of claim 4, further comprising a knockout in said top wall of said electrical box, said knockout located outside of said bar engagement channel.

7. The electrical box hanger assembly of claim 4, further comprising:
  a threaded box attachment bore centered on said mounting bracket; and
  a box mounting screw securing said electrical box to said adjustable hanger assembly.

* * * * *